June 9, 1925.

O. BERGER

HAYING TABLE

Filed July 9, 1924 2 Sheets-Sheet 1

1,541,319

Inventor

Otto Berger

By Clarence A. O'Brien

Attorney

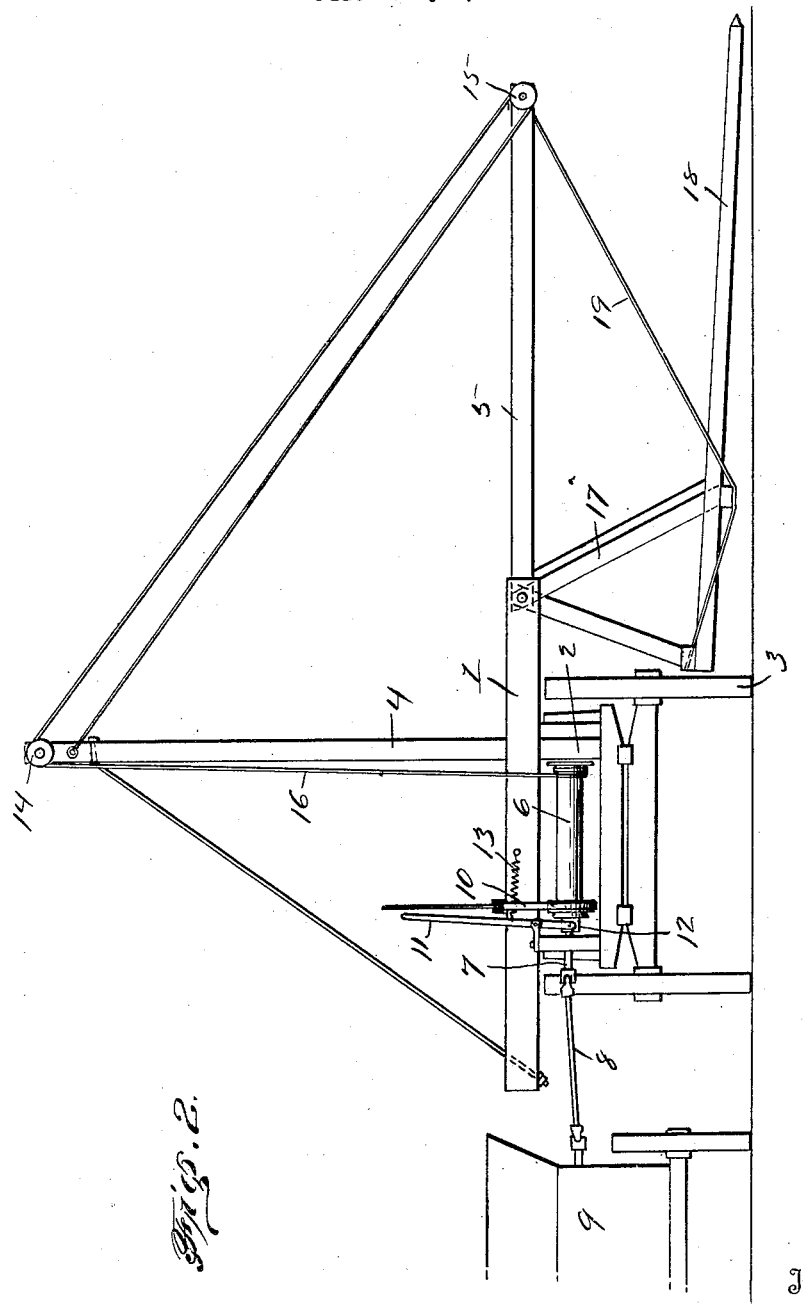

Patented June 9, 1925.

1,541,319

UNITED STATES PATENT OFFICE.

OTTO BERGER, OF MESA, ARIZONA.

HAYING TABLE.

Application filed July 9, 1924. Serial No. 725,083.

*To all whom it may concern:*

Be it known that I, OTTO BERGER, a citizen of the United States, residing at Mesa, in the county of Maricopa and State of Arizona, have invented certain new and useful Improvements in a Haying Table, of which the following is a specification.

This invention relates to a haying table structure adapted to be positioned at the side of a baling press and including means for receiving the hay from a push rake and for elevating the same and depositing it upon the table from which it may be fed into the baling box of the press.

With the above object in view the structure includes a wheel mounted platform having masts mounted thereon and with booms pivotally mounted with relation to the masts, there being provided cables for swinging the booms with relation to the masts and a drum for winding the cables. A rake structure is connected with the booms and is adapted to swing the hay which is deposited thereon, preferably by a push rake (not shown) and whereby the hay is elevated and deposited upon the platform and may be fed into the baling box of the press. Means are provided for operatively connecting the drum with the active elements of the baling press and a brake mechanism is provided for controlling the operation of the drum.

In the accompanying drawings:—

Figure 2 is a side elevation of the same illustrating the cables connected with a baling press.

Figure 1:
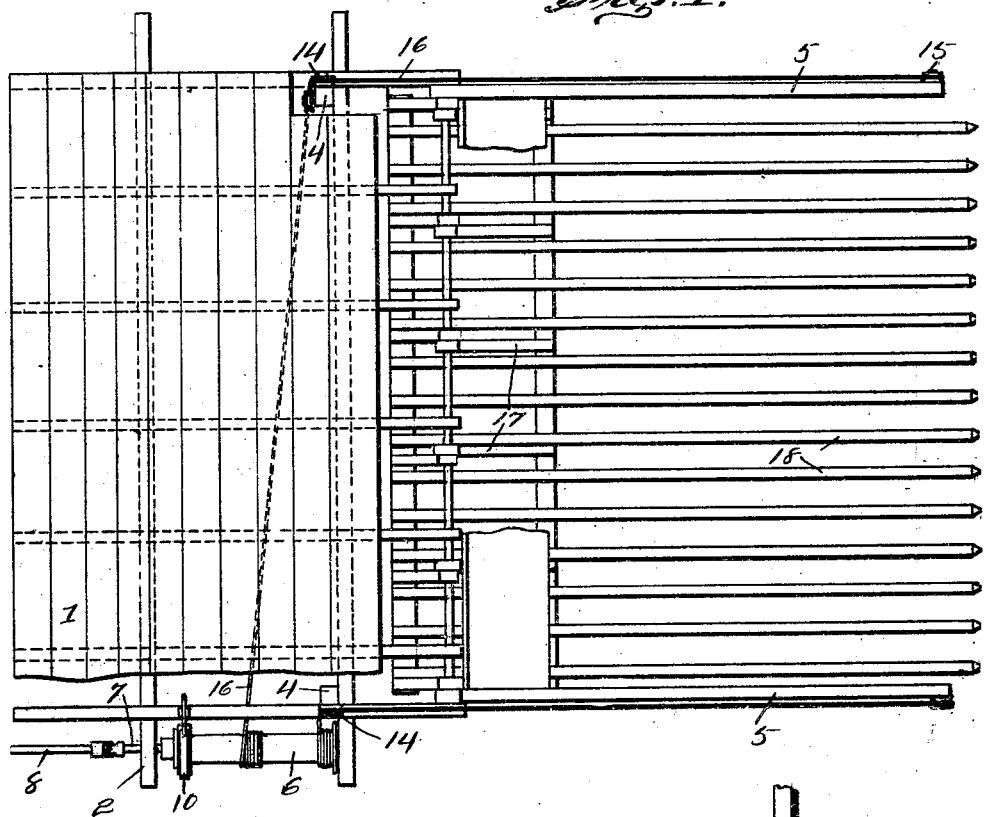
Figure 1 is a top plan view of the hay table.
Figure 3:
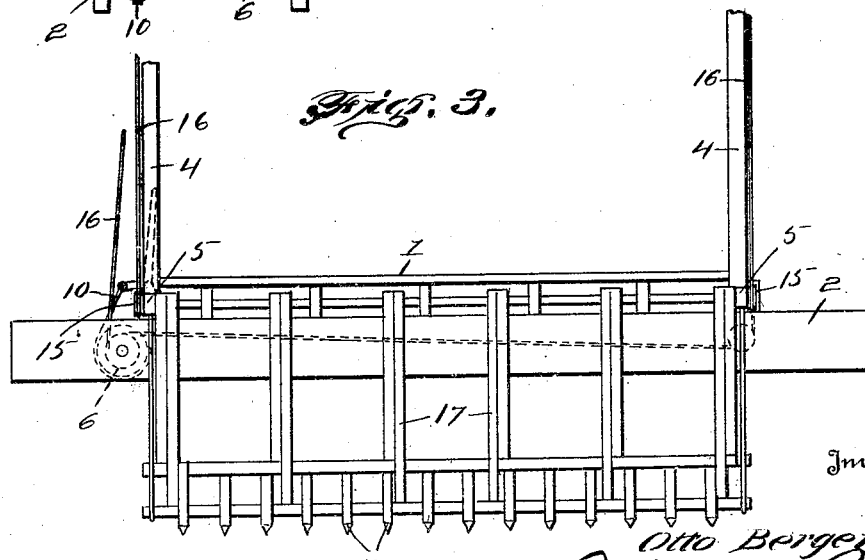
Figure 3 is an edge elevation of the same.

As illustrated in the accompanying drawings the hay table comprises a platform 1 which is mounted upon a frame 2 and which in turn is mounted upon ground engaging wheels 3. Masts 4 are mounted upon the platform and the frame and booms 5 are pivotally connected with the edge of the platform; a drum 6 is journaled for rotation at one end of the frame 2 and its shaft 7 is operatively connected by means of a shaft section 8 with a baling press 9 as best shown in Figure 2 of the drawing. A band brake mechanism 10 is provided for controlling the rotary movement of the drum 6. A lever 11 is fulcrumed upon the frame 2 and one end thereof engages a clutch member 12 which is adapted to engage the end of the drum 6 when the said lever is swung whereby the said drum is fixed with relation to its shaft 7 and may rotate with the same. A spring 13 is connected at one end with the platform 1 and at its other end with the intermediate portion of the lever 11 and is under tension with a tendency to hold the clutch member 12 out of engagement with the end of the drum 6. Therefore the lever 11 must be manually swung and held in order to hold the clutch member 12 in engagement with the end of the drum 6. When the lever 11 is so held the drum 6 is fixed with relation to the shaft 7 and the shaft section 8 and rotates simultaneously with the said shaft and shaft section. Pulleys 14 are journaled at the upper ends of the mast 4 and pulleys 15 are journaled at the outer free ends of the booms 5. Cables 16 are arranged to wind upon the drum 6 and the intermediate portions of the said cables are trained over and about the pulleys 14 and 15 and the opposite ends of the cables 16 are connected with the upper portions of the masts 4 as best indicated in Figure 2 of the drawings.

Bracket braces 17 depend from the inner ends of the booms 5 and carry tines 18 which are arranged substantially in parallel spaced relation between the bracket members. Brace rods 19 are connected at one end with the outer ends of the booms 5 and trained under the intermediate portions of the tines 18 and connected at their lower ends with the inner portions of the bracket members 17.

In operation, the haying table is connected with the baling press as shown in Figure 2 of the drawings and the hay is brought up preferably by a push rake and deposited upon the tines 18 when the said tines are in their lowered positions as shown in Figure 2. The operator then presses the lever 11 whereby the clutch member 12 is brought into engagement with the end of the drum 6 and the load of hay which has been deposited upon the tines 18 is swung in an upward direction and turned over and deposited upon the upper surface of the platform 1. From the platform 1 the hay may be passed into the baling box of the baler 9 and compressed in the form of bales in a usual manner.

From the foregoing description taken in conjunction with the accompanying drawings it will be seen that a haying table of simple and durable structure is provided and that the same may be efficiently and economically used for passing the hay from a pile deposited by a rake into the baling chamber of a baling press.

Having thus described the invention, what is claimed is:—

In a haying table, a platform, a rod supported along one side of the platform, a boom pivoted on the rod, a bracket pivoted on the rod, tines supported on the bracket and normally resting on the ground, a brace connecting the bracket and the boom, a mast rising from the platform, pulleys on the ends of the mast and the boom, a cable attached to the end of the mast and trained over the pulleys on the boom and the mast, and a drum for winding the cable so as to lift the boom and deposit the hay on the tines onto the platform.

In testimony whereof I affix my signature.

OTTO BERGER.